United States Patent
Rambo et al.

(10) Patent No.: US 12,141,275 B2
(45) Date of Patent: Nov. 12, 2024

(54) GRAPHICAL USER INTERFACE TOOL FOR CONFIGURING A VEHICLE'S INTRUSION DETECTION SYSTEM

(71) Applicant: Robert Bosch GmbH, Stuttgart (DE)

(72) Inventors: Joshua Rambo, Wixom, MI (US); Charles Mao, Canton, MI (US); Michael Tucci, Westland, MI (US); Erdenebat Gantumur, Ann Arbor, MI (US); Shweta Hegde, Dexter, MI (US)

(73) Assignee: Robert Bosch GmbH, Stuttgart (DE)

( * ) Notice: Subject to any disclaimer, the term of this patent is extended or adjusted under 35 U.S.C. 154(b) by 724 days.

(21) Appl. No.: 16/621,523

(22) PCT Filed: Apr. 11, 2018

(86) PCT No.: PCT/EP2018/059264
§ 371 (c)(1),
(2) Date: Dec. 11, 2019

(87) PCT Pub. No.: WO2018/233891
PCT Pub. Date: Dec. 27, 2018

(65) Prior Publication Data
US 2020/0117799 A1    Apr. 16, 2020

Related U.S. Application Data

(60) Provisional application No. 62/524,428, filed on Jun. 23, 2017.

(51) Int. Cl.
*G06F 21/55*    (2013.01)
*G06F 21/53*    (2013.01)

(52) U.S. Cl.
CPC ............ *G06F 21/554* (2013.01); *G06F 21/53* (2013.01); *G06F 2221/033* (2013.01)

(58) Field of Classification Search
None
See application file for complete search history.

(56) References Cited

U.S. PATENT DOCUMENTS 8,843,660 B1    9/2014    Galibois et al.
9,604,541 B1    3/2017    Anter
(Continued)

FOREIGN PATENT DOCUMENTS

CN    106059987 A    10/2016
EP    2051468 A1 *    4/2009    ............. G06N 3/126
(Continued)

OTHER PUBLICATIONS

Machine Translation of Japanese Patent Office Notice of Reasons for Refusal for Application No. 2019-570918 dated Sep. 7, 2021 (6 pages).
(Continued)

*Primary Examiner* — Benjamin E Lanier
(74) *Attorney, Agent, or Firm* — Michael Best & Friedrich LLP

(57) ABSTRACT

A system for configuring an intrusion detection system. The system includes an input device, a display device, and an electronic processor. The electronic processor is configured to receive input, via the input device. The input the electronic processor receives includes a previous configuration file, a databus configuration file, and user input. The electronic processor is also configured to run, with an intrusion detection system configuration tool, a simulation of communication on a vehicle communication system based on the input received and display, on the display device, results of running the simulation with the intrusion detection system configuration tool. The electronic processor is further configured to output a new configuration file and a file configured to be uploaded to a vehicle.

18 Claims, 15 Drawing Sheets

(56) References Cited

U.S. PATENT DOCUMENTS

| | | | |
|---|---|---|---|
| 9,774,616 B2* | 9/2017 | Flores | H04L 63/1433 |
| 2005/0182534 A1 | 8/2005 | Legate et al. | |
| 2010/0083375 A1* | 4/2010 | Friedman | H04L 63/1433 |
| | | | 726/22 |
| 2016/0294870 A1 | 10/2016 | Banerjee et al. | |
| 2017/0093904 A1* | 3/2017 | Ng | H04L 63/20 |
| 2017/0093910 A1* | 3/2017 | Gukal | H04L 63/1416 |
| 2017/0169230 A1* | 6/2017 | Zheng | G06N 20/00 |
| 2018/0130004 A1* | 5/2018 | Morgheim | G06Q 10/06395 |

FOREIGN PATENT DOCUMENTS

| | | | | | |
|---|---|---|---|---|---|
| EP | 3179401 A1 | 6/2017 | | | |
| JP | 2015210814 A | 11/2015 | | | |
| JP | 2017059210 A | 3/2017 | | | |
| JP | 2017091537 A | 5/2017 | | | |
| WO | WO-2014066500 A1 * | 5/2014 | | H04L 41/147 |
| WO | WO-2016151566 A1 * | 9/2016 | | G06F 21/554 |
| WO | WO-2017131963 A1 * | 8/2017 | | H04L 41/145 |

OTHER PUBLICATIONS

Translation of Japanese Patent Office Notice of Reasons for Refusal for Application No. 2019-570918 dated Feb. 26, 2021 (5 pages).
International Search Report and Written Opinion dated Jul. 11, 2018, Appl. No. PCT/EP2018/059264, filed Apr. 11, 2018.
Translation of Korean Patent Office Notice of Preliminary Rejection for Application No. 10-2019-7037775 dated Aug. 1, 2022 (8 pages).
Translation of Chinese Patent Office Action for Application No. 201880041673.8 dated Apr. 13, 2023 (12 pages).

* cited by examiner

FIG. 15

```
File  Edit  Format  View  Help
Name Timestamp,         Name Source BUS,          Name ID,          Name Contents,                          Violation
5.005000,2,0x264000,0x000600000000000000, Unknown CAN ID detected
5.016072,2,0xF1,0x99000891FFEF, Reserved bit Violation detected
15.058512,2,0x135,0x05000002000000040, Signal value table violation detected
15.109882,2,0x260,0xE800000D20C350000 Signal value range violation detected
15.109882,2,0x260,0xE800000D20C350000 Signal value range-of-change violation
15.209994,2,0x260,0xE80000000C350000, Signal value range-of-change violation
15.309852,2,0x260,0xE80000000C350000 Signal value range-of-change violation
15.409985,2,0x260,0xE80000000C350000, Signal value range-of-change violation
15.508817,2,0x260,0xE80000000C350000, Signal value range-of-change violation
15.609873,2,0x260,0xE80000000C350000, Signal value range-of-change violation
15.709986,2,0x260,0xE80000000C350000, Signal value range-of-change violation
15.808813,2,0x260,0xE80000000C350000, Signal value range-of-change violation
15.909806,2,0x260,0xE80000000C350000, Signal value range-of-change violation
20.148396,2,0x12A,0x10E07063000000A4,Counter sequence violation detected
20.988239,2,0xF1,0xA50000801FF, DLC value violation detected
589.400024,2,0x140,0x140200, Message piggybacking attempt detected
589.400024,2,0x140,0x140200, Message piggybacking attempt detected
589.500000,2,0x140,0x140200, Message piggybacking attempt detected
589.599976,2,0x140,0x140200, Message piggybacking attempt detected
590.000000,2,0x140, NA, Message rate too high detected
5.006000,1,0x7E7,0x043BEB0000AAAAAA, Unknown CAN ID detected
15.106192,1,0x264000,0x000600000D20000, Signal value range violation detected
109.810905,1,0x100,0x, Unknown CAN ID detected
110.288956,1,0x100,0x, Unknown CAN ID detected
214.179764,1,0x100,0x, Unknown CAN ID detected
214.655365,1,0x100,0x, Unknown CAN ID detected
319.197449,1,0x100,0x, Unknown CAN ID detected
319.660950,1,0x100,0x, Unknown CAN ID detected
430.773865,1,0x100,0x, Unknown CAN ID detected
431.248840,1,0x100,0x, Unknown CAN ID detected
435.885529,1,0x100,0x, Unknown CAN ID detected
564.302307,1,0x100,0x, Unknown CAN ID detected
564.693787,1,0x100,0x, Unknown CAN ID detected
589.849976,1,0x62E,0x000000000000000000,Message piggybacking attempt detected
590.049988,1,0x62E, NA, Message rate too high detected
```

240

GRAPHICAL USER INTERFACE TOOL FOR CONFIGURING A VEHICLE'S INTRUSION DETECTION SYSTEM

RELATED APPLICATIONS

The present application claims priority to U.S. Provisional Application No. 62/524,428, filed Jun. 23, 2017, the entire contents of which is hereby incorporated by reference.

FIELD

Embodiments relate to configuration of an intrusion detection system of a vehicle.

BACKGROUND

Modern vehicles are equipped with numerous computers and electrical components that control various vehicle systems. These computers and components communicate by sending and receiving messages to and from each other.

SUMMARY

The present invention relates to the configuration of intrusion detection systems for computerized, vehicle-control systems.

The messages that computers and components send and receive include a message identifier followed by a plurality of signals. It is possible to change a vehicle's behavior by disrupting communication between computers and electrical components in the vehicle. Increasing computer connectivity in vehicle systems increases the risk that messages and signals are falsely transmitted or otherwise corrupted. Anomalies may be caused by unexpected vehicle behavior or attacks from outside sources. An intrusion detection system can be used to detect these potential anomalies.

The results of messages being improperly transmitted include, among other things, driver annoyance, driver distraction, or changes in vehicle behavior. Because messages and signals are different in different vehicles there is a need for a configuration tool that allows manufactures and suppliers of vehicles to quickly and accurately configure, simulate, and reconfigure automobile intrusion detection systems.

Embodiments provide, among other things, a system and a method for configuring an intrusion detection system.

One embodiment provides a system for configuring an intrusion detection system. The system includes an input device, a display device, and an electronic processor. The electronic processor is configured to receive input, via the input device. The input the electronic processor receives includes a previous configuration file, a data bus configuration file, and user input. The electronic processor is also configured to run, with an intrusion detection system configuration tool, a simulation of communication on a vehicle communication system based on the input received and configured to display, on the display device, results of running the simulation with the intrusion detection system configuration tool. The electronic processor is further configured to output a new configuration file and a file configured to be uploaded to a vehicle.

Another embodiment provides a method for configuring an intrusion detection system. The method includes setting a configuration value. The method also includes running, with an electronic processor, a simulation of communication on a vehicle communication system with a trace file, and generating results of the simulation. The method also includes receiving, with the electronic processor, an adjustment input for the configuration value and outputting, with the electronic processor, a file including a configuration values (or configured values) for the intrusion detection system. The output file is configured to be uploaded to a vehicle.

Other aspects, features, and embodiments will become apparent by consideration of the detailed description and accompanying drawings.

BRIEF DESCRIPTION OF THE DRAWINGS

FIG. 6 through FIG. 15 illustrate the process of configuring the intrusion detection system using a graphical user interface.

DETAILED DESCRIPTION

Figure 1:
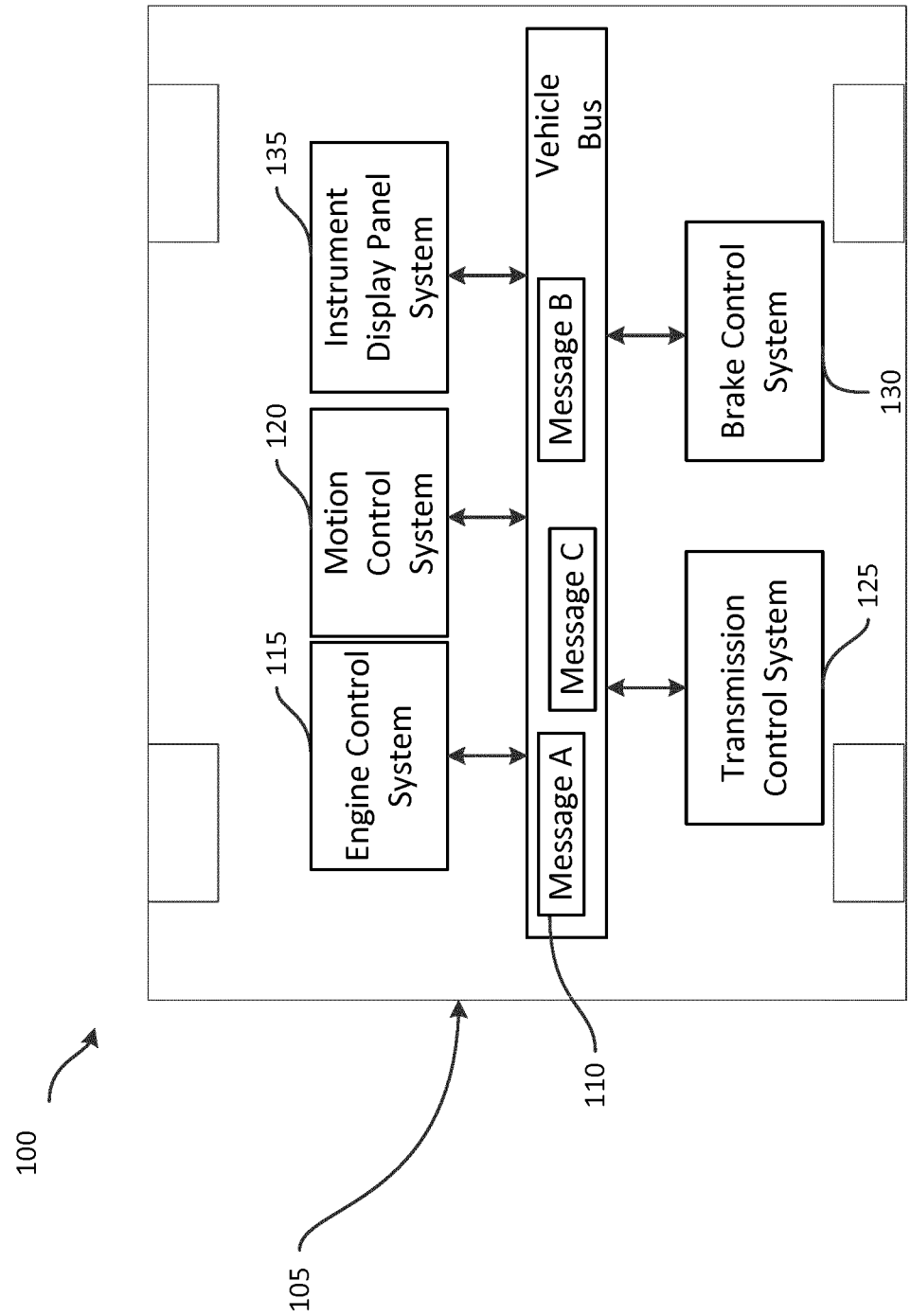
FIG. 1 is a simplified diagram of a vehicle's communication system.

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

FIG. 1 illustrates a communication system 100 of a vehicle 105. The vehicle 105, although illustrated as a four-wheeled vehicle, may encompass various types and designs of vehicles. For example, the vehicle 105 may be an automobile, a motorcycle, a truck, a bus, a semi-tractor, and others. In the example illustrated, the communication system 100 allows several systems (electronic control units) to communicate with each other by sending messages 110 to each other via various wired or wireless connections. Examples of systems which communicate with each other are an engine control system 115, a motion control system 120, a transmission control system 125, a brake control system 130, and the instrument panel display system 135. These systems may be of various constructions and may use various communication types and protocols. In some embodiments, systems which communicate with each other are communicatively coupled via a shared communication link such as a vehicle communication bus (for example, a controller area network (CAN) bus) or a wireless vehicle network.

Each of the above-listed systems interacting with each other over the communication system 100 may include dedicated processing circuitry including an electronic control unit for receiving, processing, and transmitting data associated with the functions of each system. For example, the engine control system 115 includes an electronic control unit that receives messages 110, checks that there are no potentially harmful anomalies associated with the messages 110, and sends messages 110. The embodiment illustrated in FIG. 1 provides but one example of the components and connections of the communication system 100. However, these components and connections may be constructed in ways other than those illustrated and described herein.

Figure 2:
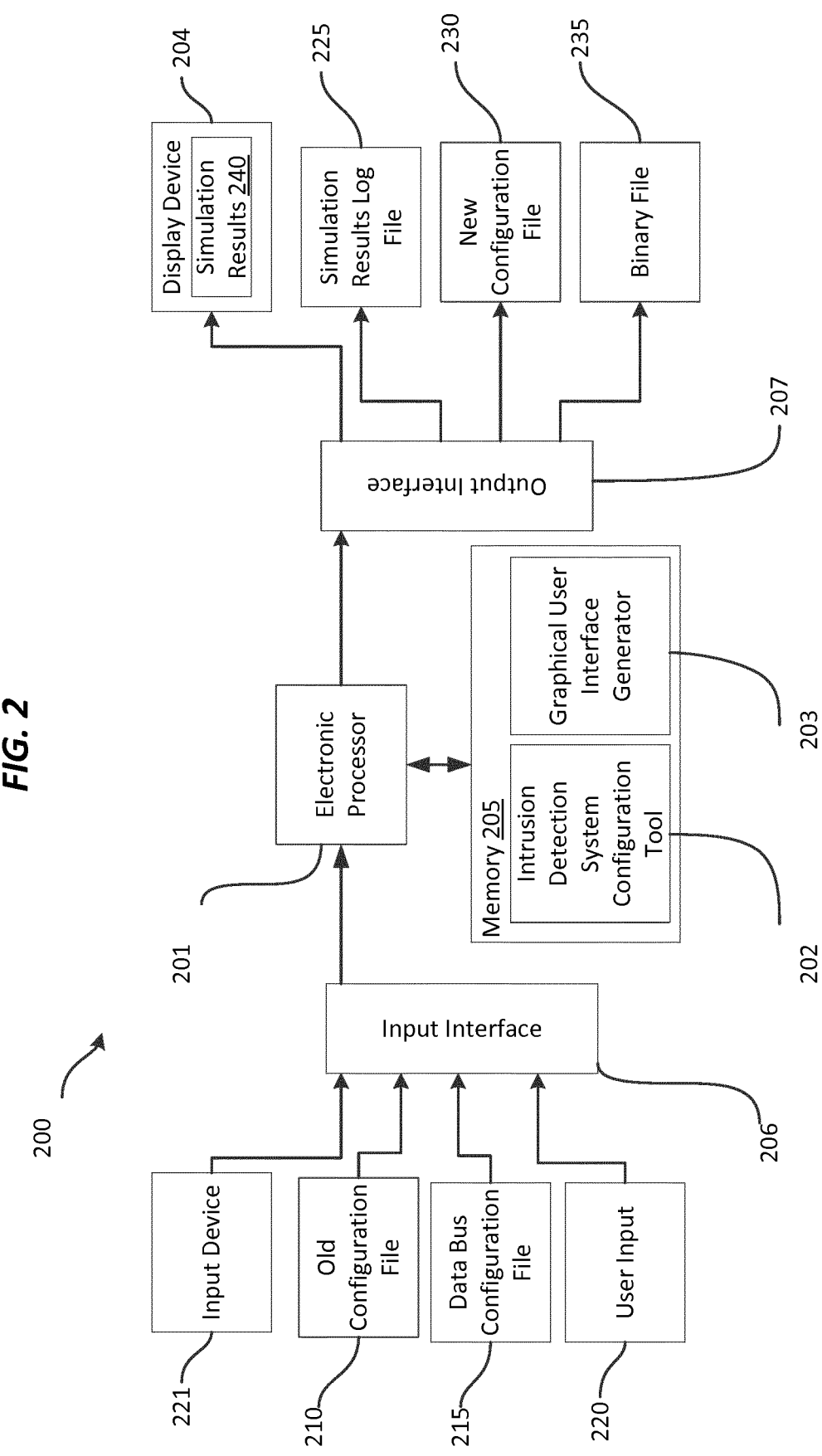
FIG. 2 is a diagram of an electronic control unit for running an intrusion detection system configuration tool on an electronic processor, as well as the inputs and outputs of the electronic control unit.

FIG. 2 illustrates a system 200 for configuring an intrusion detection system. It should be understood that in some embodiments, the system 200 includes additional, fewer, or different components than those described herein. It should also be understood that the system 200 may contain sub-modules that include additional electronic processors, memory, or application specific integrated circuits (ASICs) for handling input/output functions and application of the methods listed below. In the embodiment illustrated in FIG. 2, the system 200 includes an electronic processor 201. The electronic processor 201 included in the embodiment illustrate in FIG. 2 is configured to run an intrusion detection system configuration tool 202 and to provide a graphical user interface (GUI) for the intrusion detection system configuration tool 202. The GUI is generated by a GUI generator 203 and is displayed on a display device 204. The display device 204 may include, for example, a touchscreen, a liquid crystal display (LCD), a light-emitting diode (LED) display, an organic LED (OLED) display, an electroluminescent display (ELD), and the like. The intrusion detection system configuration tool 202 allows an intrusion detection system to be configured for different types of vehicles by, for example, simulating communication between electronic control units included in a vehicle. For example, the intrusion detection system configuration tool 202 may simulate communication between electronic control units (or systems) included in the communication system 100 of the vehicle 105. In some embodiments, the electronic processor 201 executes the intrusion detection system configuration tool 202 without connecting to the vehicle.

The system 200 includes a plurality of electrical and electronic components that provide power, operation control, and protection to the components and modules within the system 200. The system 200 includes, among other things, an electronic processor 201 (such as a programmable electronic microprocessor, microcontroller, or similar device), a memory 205 (for example, non-transitory, computer-readable medium), an input interface 206, and an output interface 207. The electronic processor 201 is communicatively connected to the memory 205, input interface 206, and output interface 207. The intrusion detection system configuration tool 202 and the GUI generator 203 are stored in the memory 205 and configured to be executed by the electronic processor 201. The electronic processor 201, in coordination with the memory 205, the input interface 206, and output interface 207, is configured to implement, among other things, the methods described herein.

In one example, when executing the intrusion detection system configuration tool 202 the electronic processor 201 receives, as input, a selection of an old configuration file 210 for an intrusion detection system, a selection of a data bus configuration (DBC) file 215, and user input 220, via an input device 221 connected to the input interface 206. The input device 221 may be, for example, a keypad, a mouse, a touchscreen, a microphone, a camera, or the like. When running the intrusion detection system configuration tool 202, the electronic processor 201 outputs or generates, via the output interface 207, a simulation results log file 225 (a log file), a new configuration file 230 for the intrusion detection system, and a binary file 235. In some embodiments, the results 240 of the simulation included in the simulation results log file 225 are displayed on the display device 204 that is connected to the output interface 207. The old configuration file 210 contains previously selected configuration values for the intrusion detection system. The DBC file 215 is defined as a file containing a database of messages and signals associated with the vehicle 105 (the vehicle with the intrusion detection system that the configuration values are for). The electronic processor 201, when executing the intrusion detection system configuration tool 202, uses the DBC file 215 to run a simulation of communication on a vehicle communication system (for example, the communication system 100 of the vehicle 105) to test the configuration values for the intrusion detection system. The new configuration file 230 contains data associated with current configuration values for the intrusion detection system. The binary file 235 is a file used to upload the current configuration values for the intrusion detection system to the vehicle 105.

The user input 220 may include, among other things, adjusted configuration values. In certain instances, the electronic processor 201 sets the configuration values based on the user input 220. Configuration values are associated with messages and signals. An example of a configuration value associated with the messages 110 is a message identifier. Another example of a configuration value is a predetermined period of time. If the electronic processor 201 receives more than one message with the same message identifier within the predetermined period of time, the electronic processor 201 records an anomaly (for example, a piggy-backing error). Examples of configuration values associated with messages 110 also include an upper threshold and a lower threshold for the number of messages 110 that may be received within a predetermined time period (for example, an upper limit and a lower limit for the rate that messages 110 are received) without causing the electronic processor 201 to detect an anomaly. Other examples of configuration values include a location of reserved bits where no signal is defined in the messages 110 and predetermined requirement for valid message length. The predetermined requirement for valid message length may be a minimum message length, a maximum message length, or other message length. Examples of configuration values associated with signals include a range that the signals should not be in (for example, an invalid range) and a range that the signals should be in (for example, a valid range). The valid range and invalid range are, for example, a range of linear values. In some embodiments, configuration values associated with the signals are the signal values included in a table of valid signal values. If the value of a signal is not in the table of valid signal values, the electronic processor 201, for example, generates an error message. In other embodiments, configuration values associated with the signals are the signal values included in a table of invalid signal values. If the value of a signal is in the table of invalid signal values, the electronic processor 201, for example, generates an error message. Another configuration value associated with the signals is, for example, a predetermined threshold rate that the value of a signal changes.

Figure 3:
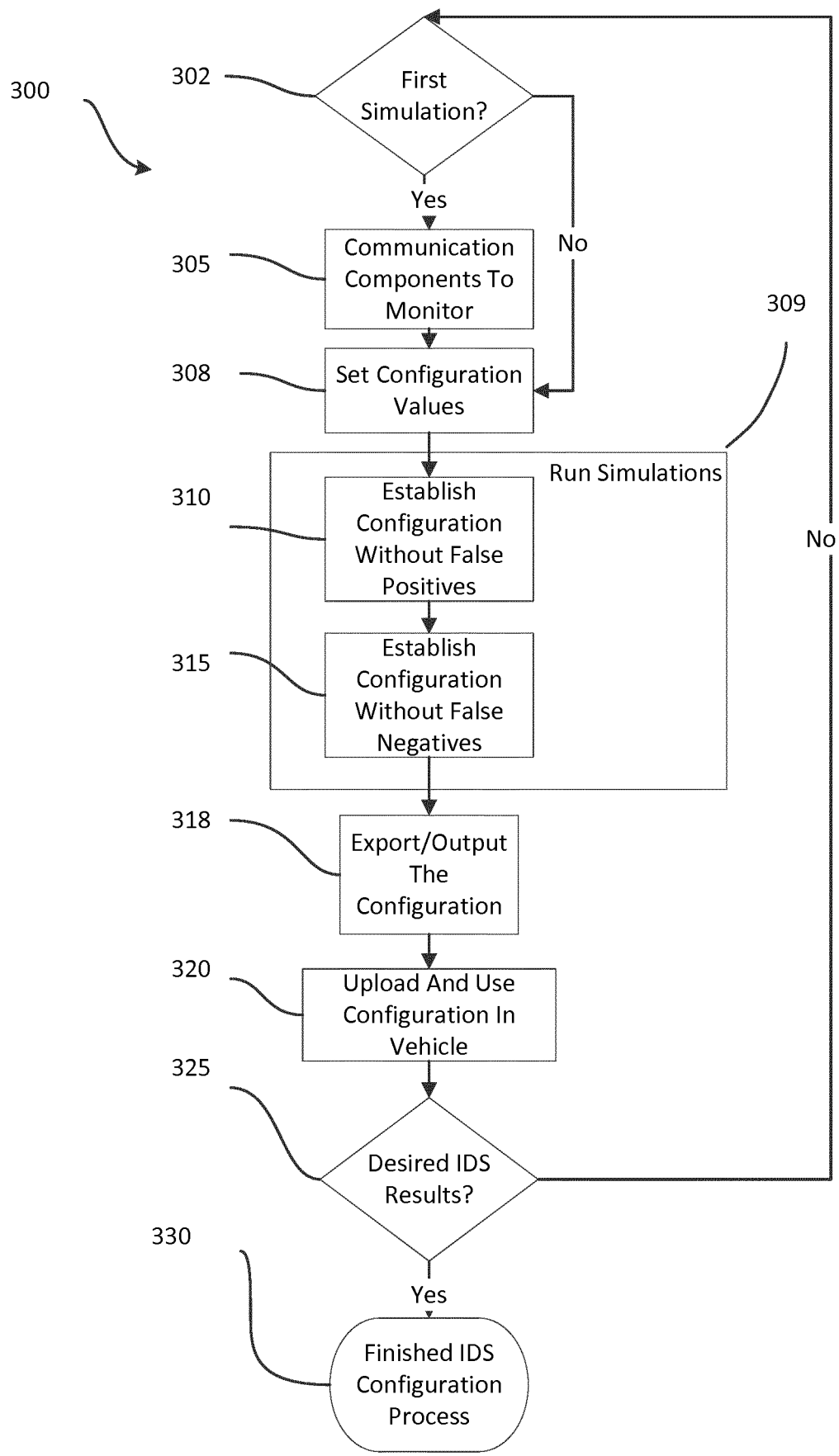
FIG. 3 is a flow chart of a method for configuring an intrusion detection system with a graphical user interface.

FIG. 3 illustrates an example method 300 for configuring an intrusion detection system. When a first simulation is run using the intrusion detection system configuration tool 202 (block 302), the electronic processor 201 receives a selection of a plurality of buses and a selection of communication components to monitor (block 305). When the electronic processor 201 receives a selection of a plurality of buses, the electronic processor 201 runs a simulation to test, for example, a subset of the configuration values of electronic control units, messages, and signals associated with the selected plurality of buses. The communication components the electronic processor 201 may receive a selection of include buses, electronic control units, signals, and messages 110. In some embodiments, monitoring includes the electronic processor 201 performing in depth testing of the configuration values of the selected communication component. As described in further detail below, the electronic processor 201 preforms in depth testing (for example, by testing all the configuration values associated with a message, performing multiple tests for a configuration value associated with a message, or both). The electronic processor 201 also receives a selection of configuration values (block 308). The electronic processor 201 then runs a simulation using the selected configuration values (block 309). Running the simulation causes the electronic processor 201 to generate the results 240 of the simulation. As described in greater detail in FIG. 4, the electronic processor 201 continues receiving modifications to the configuration values (adjustment input) and running simulations until a predetermined number of simulations are run and each simulation that is run results in no false positives (block 310). False positives occur, for example, when the intrusion detection system detects an anomaly but the intrusion detection system should not have detected the anomaly.

Figure 4:
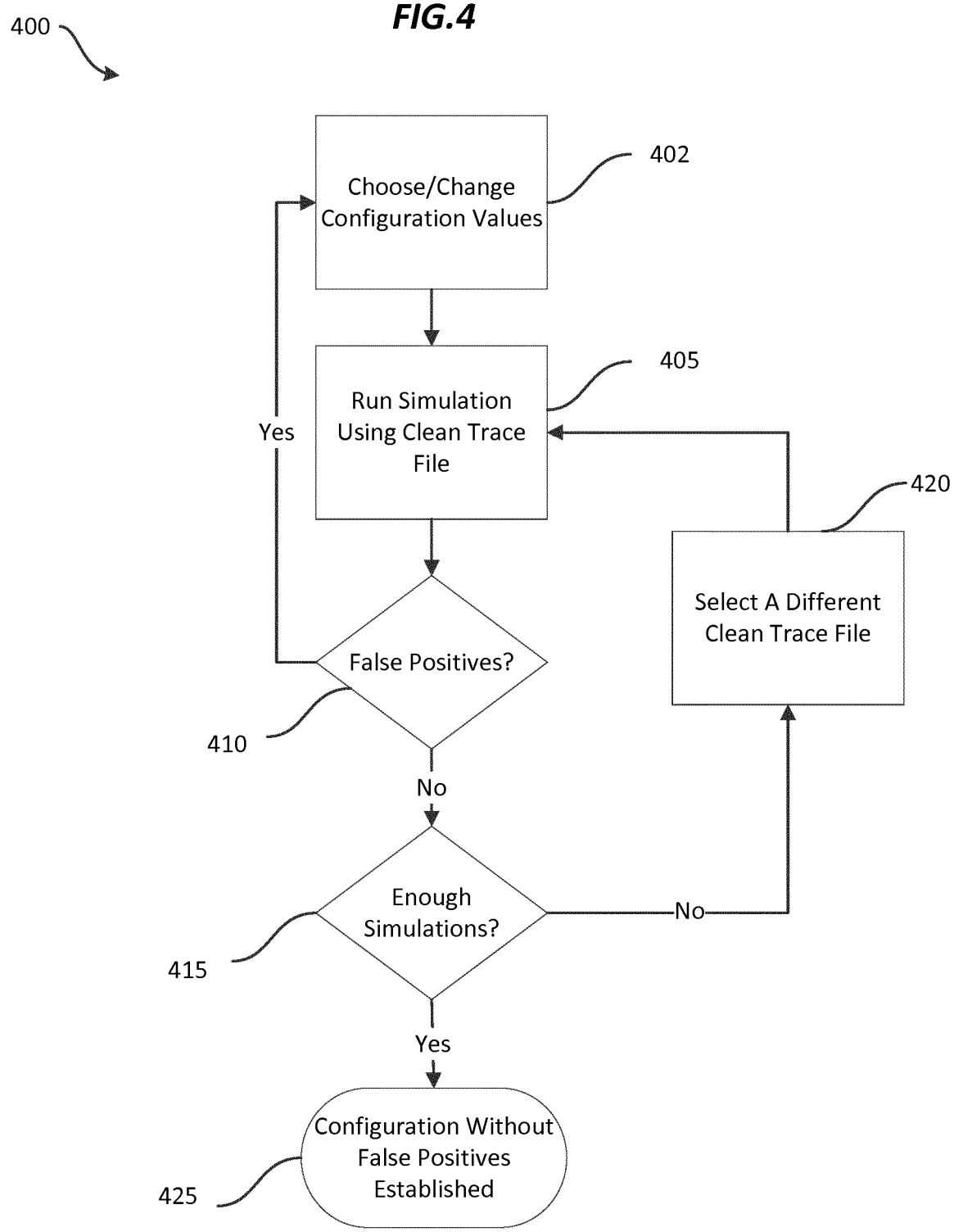
FIG. 4 is a flow chart of a method for choosing configuration values that cause the intrusion detection system to report no errors when a simulation is run with a clean trace file.

FIG. 4 illustrates a method 400 for eliminating false positives from the results 240 of each simulation. The electronic processor 201 receives a selection of a plurality of configuration values (block 402), and runs a simulation with a clean trace file (block 405). A clean trace file contains message data for testing current configuration values for the intrusion detection system. The message data in the clean trace file does not contain data that should cause the intrusion detection system to detect an anomaly. In some embodiments, if there is a false positive in the results 240 of the simulation (block 410), the electronic processor 201 receives adjustment input, changes a plurality of configuration values associated with the communication components of the intrusion detection system based on the adjustment input (block 402), and runs the simulation again with the clean trace file (block 405). In other embodiments, the electronic processor 201 may automatically adjust the plurality configuration values based on the results 240 of the simulation. If running the simulation does not result in any false positives, the electronic processor 201 determines if there have been enough simulations run with different clean trace files (block 415). For example, the electronic processor 201 may compare the number of simulations run with different clean trace files to a predetermined value in order to determine if there have been enough simulations run with different clean trace files. If there have not been enough simulations run with different clean trace files, the electronic processor 201 chooses a new clean trace file (block 420) and runs a simulation with the new clean trace file (block 405). The results 240 of the simulation run are stored in the simulation results log file 225 and the results 240 of the simulation included in the simulation results log file 225 are displayed in the GUI on the display device 204. Once no false positives are detected and there have been enough simulations run with different clean trace files, the method 400 is complete (block 425).

Returning to FIG. 3, the electronic processor 201 runs simulations (block 309) and receives modifications to the configuration values until the results 240 of each simulation include no false negatives (block 315). False negatives occur when the intrusion detection system should detect an anomaly but the intrusion detection system does not detect the anomaly.

Figure 5:
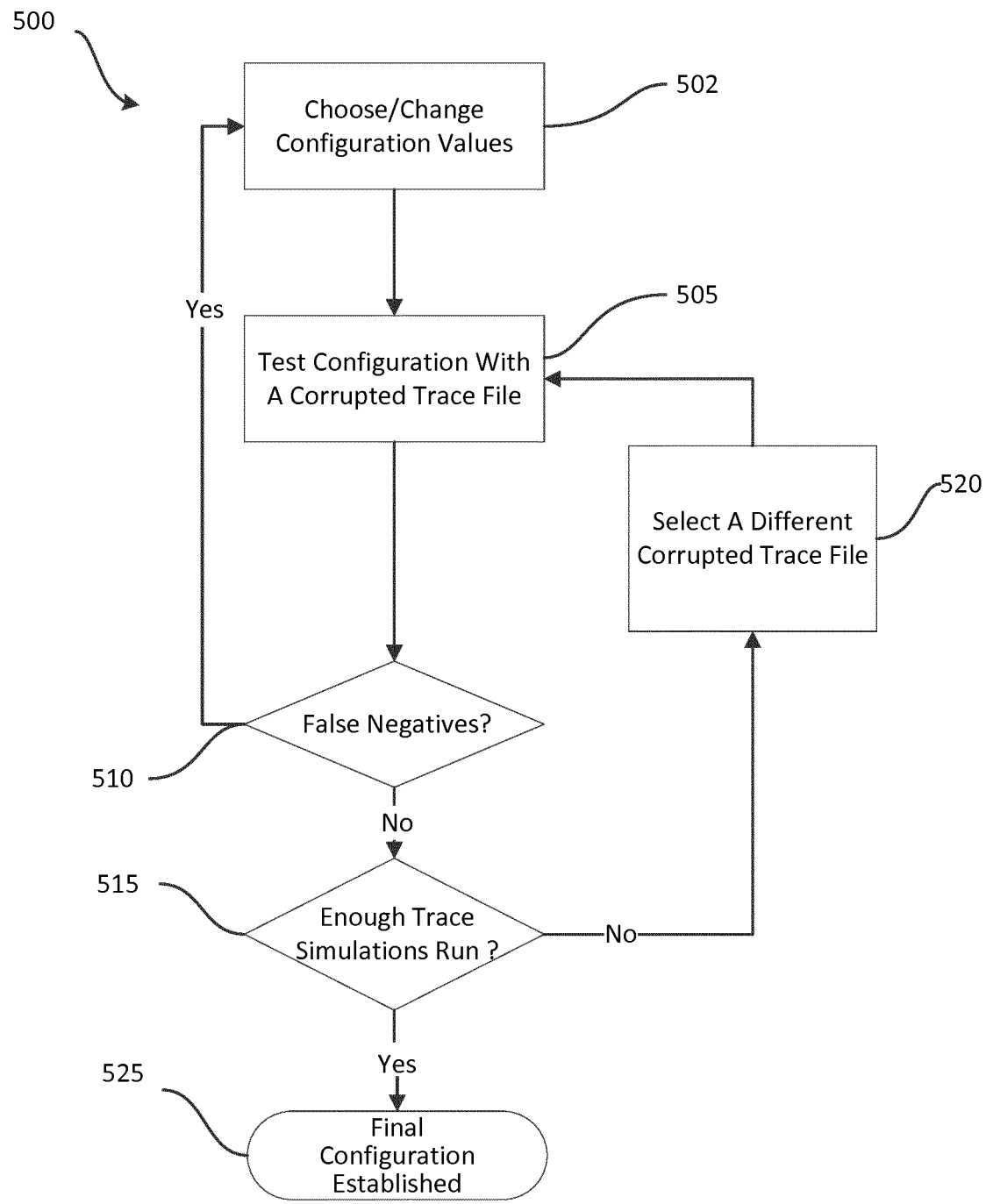
FIG. 5 is a flow chart of a method for choosing configuration values that cause the intrusion detection system to report an error when a simulation is run with a corrupted trace file.

FIG. 5 illustrates an example method 500 for eliminating false negatives from the results 240 of each simulation. In the example shown, the electronic processor 201 receives a selection of a plurality of configuration values (block 502) runs a simulation with a corrupted trace file (block 505). A corrupted trace file contains message data used to test current configuration values for the intrusion detection system. The message data in the corrupted trace file contains data which should cause the intrusion detection system to detect an anomaly. If there is a false negative in the results 240 of the simulation (block 510), the user changes the configuration values (block 502) and runs the simulation again with the corrupted trace file (block 505). If running the simulation does not result in any false negatives, the electronic processor 201 determines if there have been enough simulations run with different corrupt trace files (block 515). For example, the electronic processor 201 may compare the number of simulations run with different corrupted trace files to a predetermined value in order to determine if there have been enough simulations run with different corrupted trace files. If there have not been enough simulations run with different corrupt trace files, the electronic processor 201 chooses a new corrupt trace file (block 520) and runs the simulation with the new corrupt trace file (block 505). The results 240 of the simulation run are stored in the simulation results log file 225 and the results 240 of the simulation included in the simulation results log file 225 are displayed in the GUI on the display device 204. Once no false negatives are detected and there have been enough simulations run with different corrupt trace files the method 500 for eliminating false negatives from the results 240 of each simulation is complete (block 525).

Returning again to FIG. 3, once the results 240 of each simulation no longer include false positives, false negatives, or both, the binary file 235, output by the intrusion detection system configuration tool 202 (block 318), may be uploaded to the vehicle 105 (block 320). As stated above, the binary file 235 is a file used to upload the current configuration values of the intrusion detection system to the vehicle 105 (block 320). The intrusion detection system is tested within the vehicle 105 with the configuration values in the binary file 235. If the intrusion detection system within the vehicle 105 (using the configuration values in the binary file 235) does not detect false positives, false negatives, or both (block 325), the method 300 ends (block 330). If the intrusion detection system within the vehicle 105 (using the configuration values in the binary file 235) detects false positives, false negatives, or both (block 325), the method 300 begins again.

Figure 6:
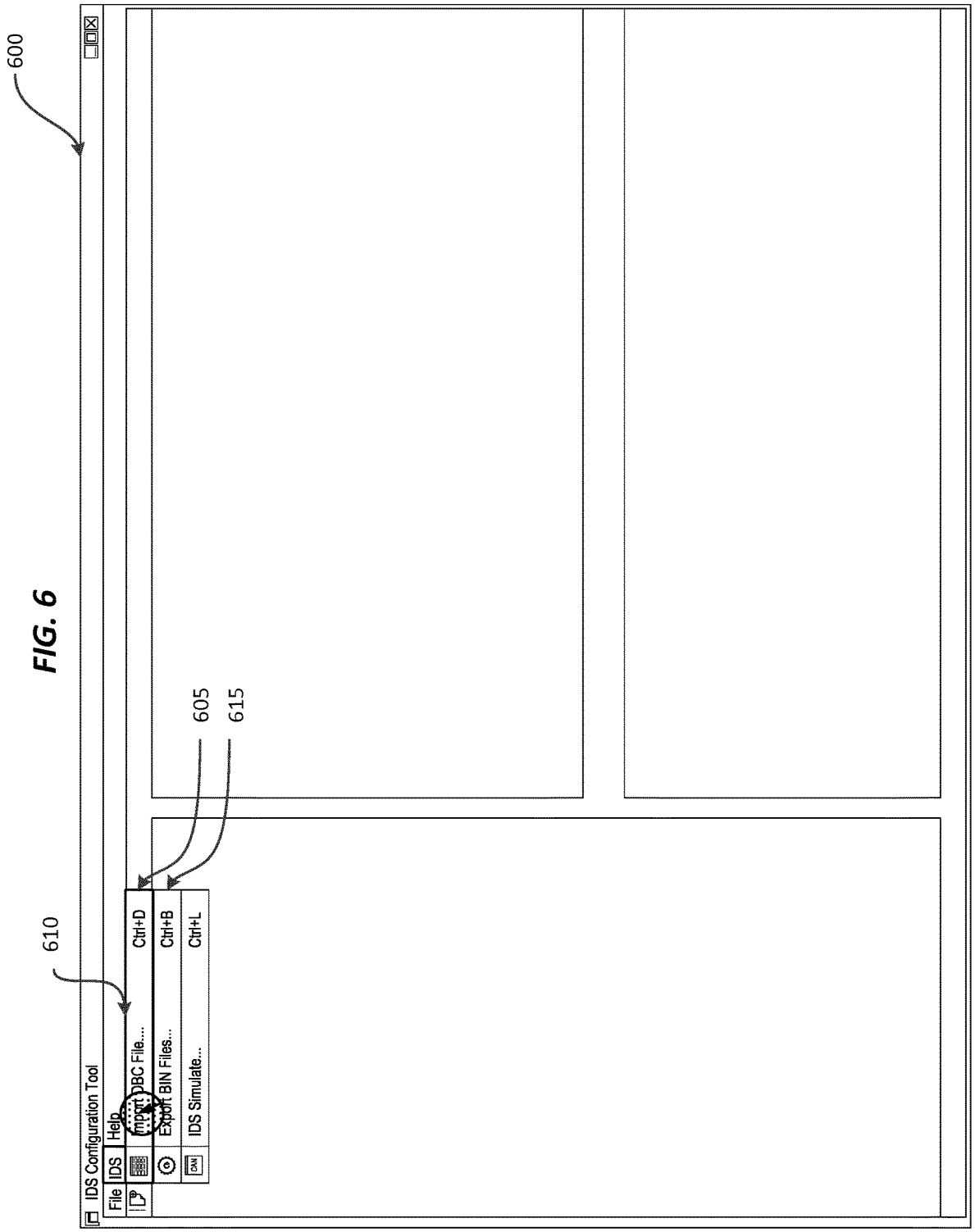

FIG. 6 illustrates an example window 600 displayed on the display device 204 in the GUI generated by the GUI generator 203. In the example provided, the window 600 allows a user to access the intrusion detection system configuration tool 202. In the window 600, a user may import the DBC file 215 by selecting an option 605 in a drop down menu 610. The drop down menu 610 also includes an option 615 for exporting a binary file, for example, the binary file 235 including configuration values.

Figure 7:
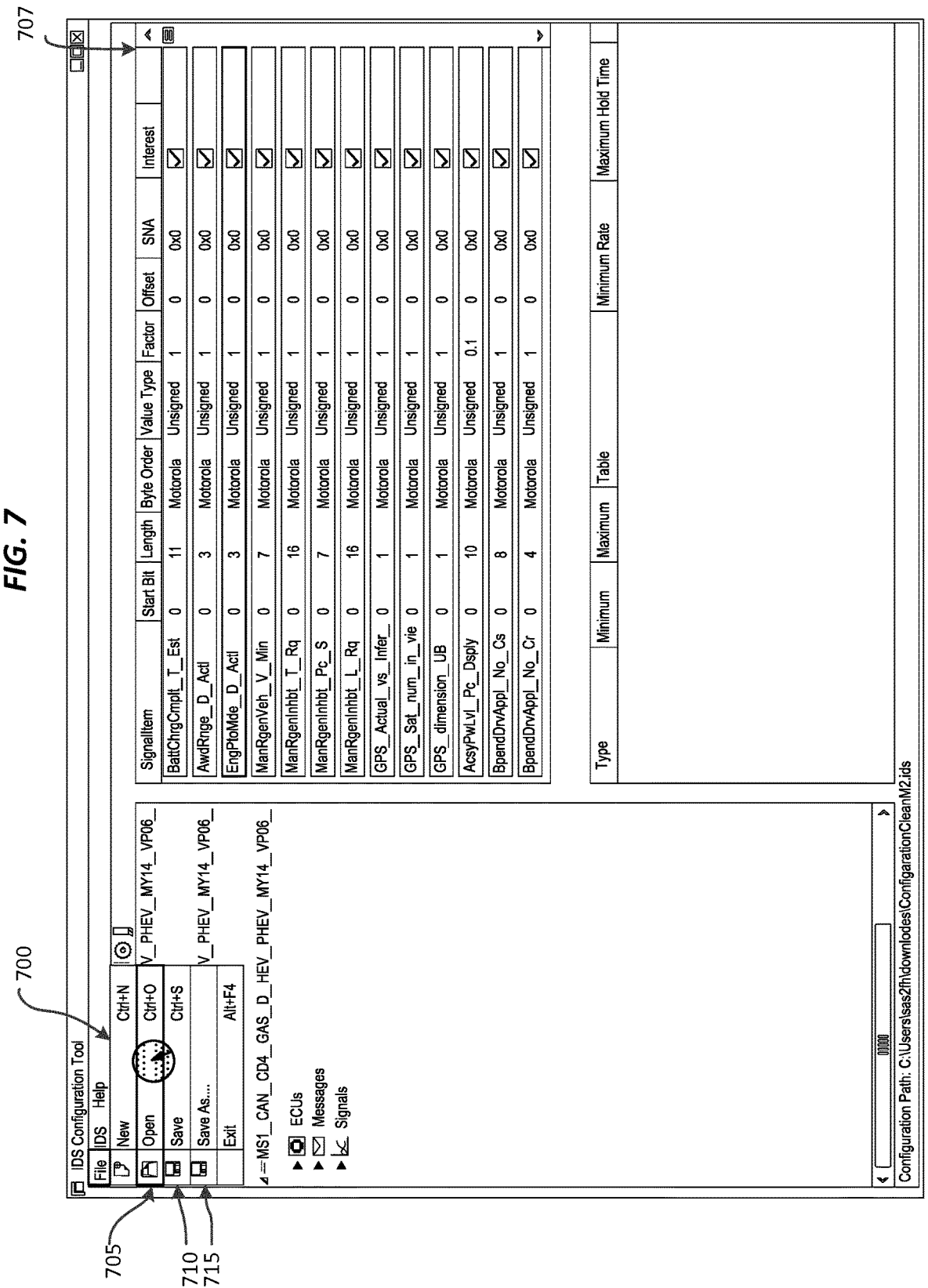

FIG. 7 illustrates an example configuration file and a drop down menu 700 for the configuration file within the window 600. In some embodiments, receiving a selection of an open option 705 included in the drop down menu 700 causes the electronic processor 201 to open a previously saved configuration file (for example, old configuration file 210). In the illustrated example, when the old configuration file 210 opens, the electronic processor 201 displays (for example, in a pane 707) configuration values included in the old configuration file 210. In some embodiments, a save option 710 and a save as option 715 included in the drop down menu 700 allow the user to create a new configuration file 230 to be exported.

Figure 8:
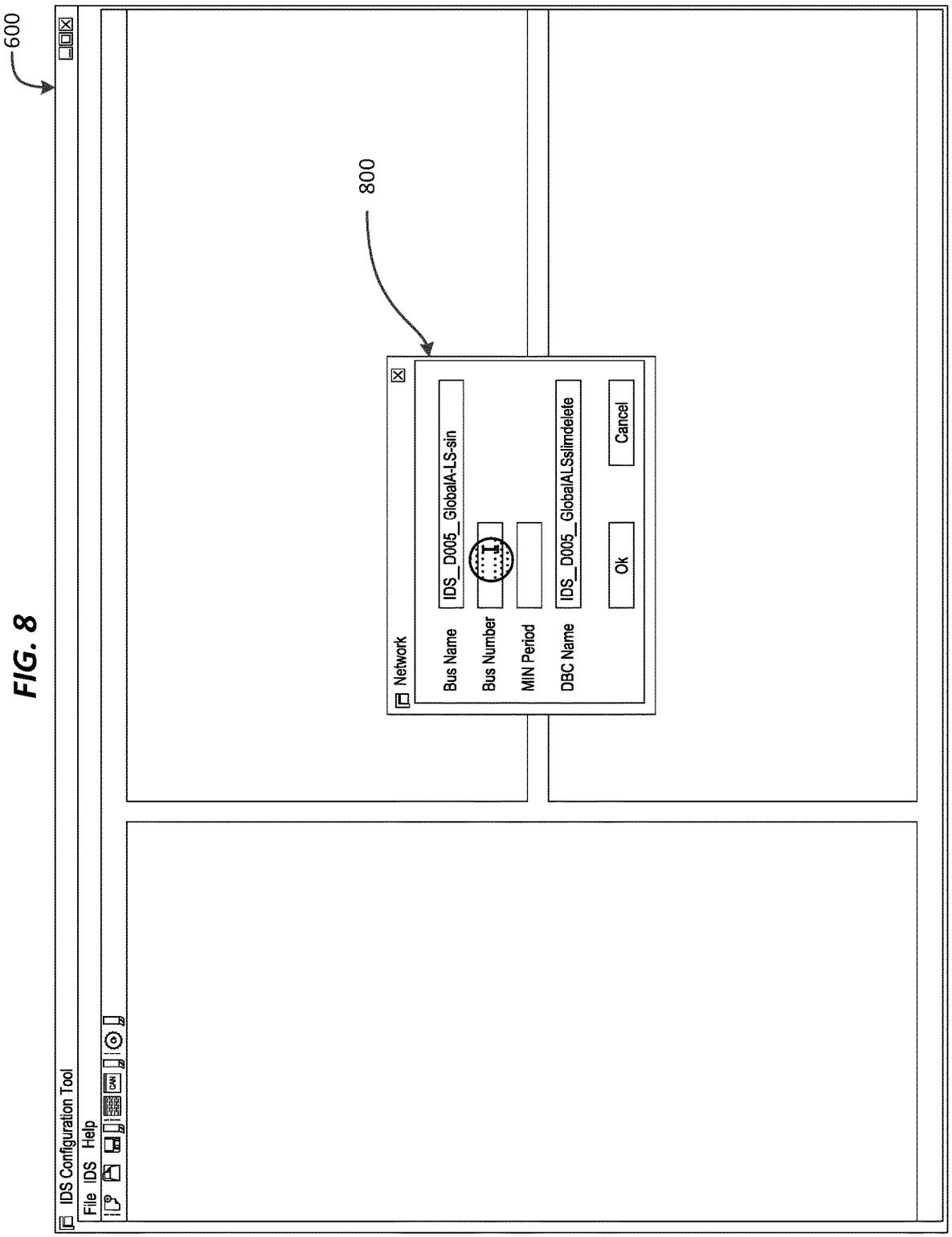

In FIG. 8, a dialogue box 800 that allows a user to select a plurality of buses is illustrated. The electronic processor 201 tests a subset of the configuration values of the electronic control units, messages, and signals associated with the selected plurality of buses during the configuration process (block 305 of FIG. 3).

Figure 9:
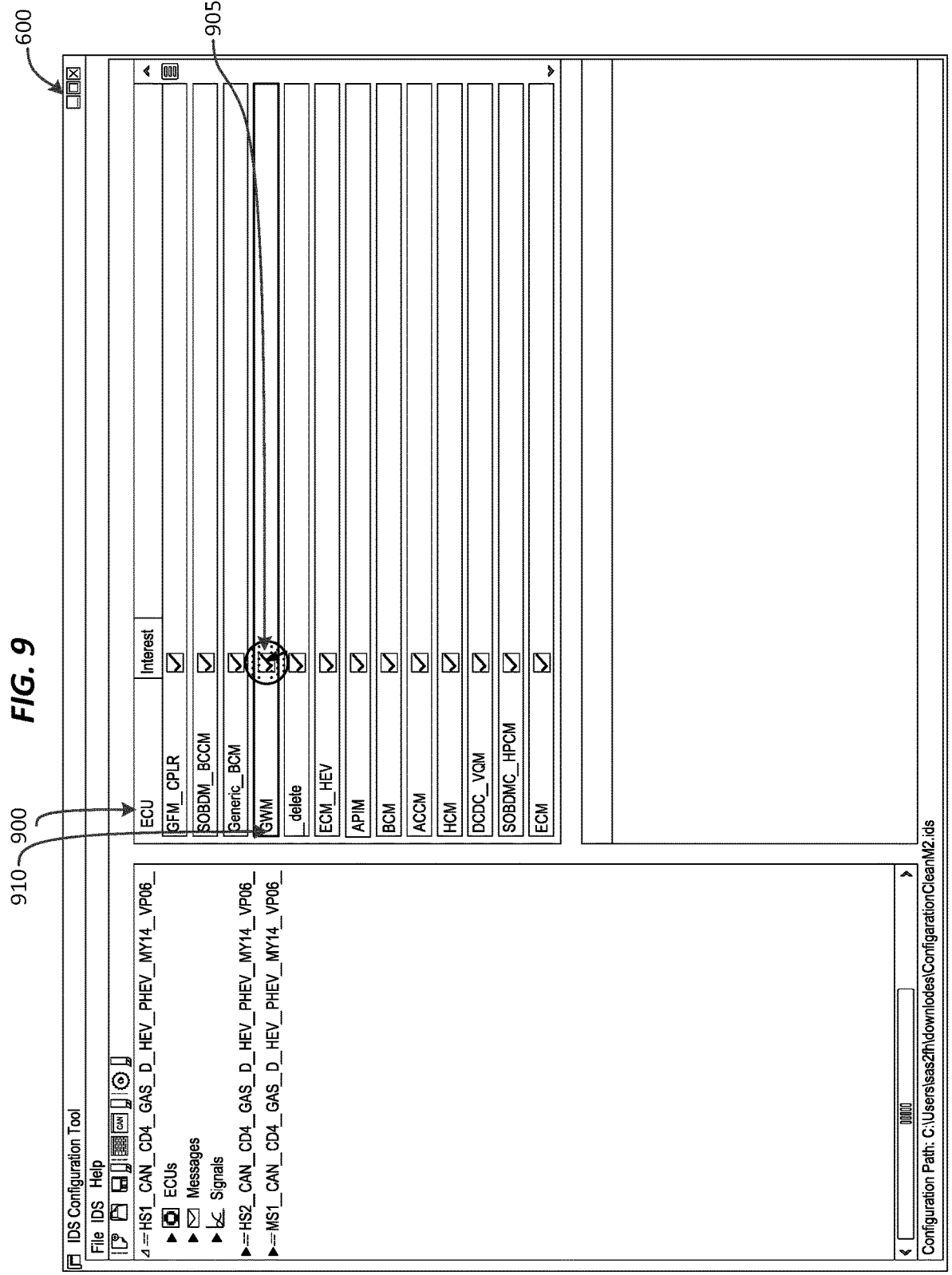
Figure 10:
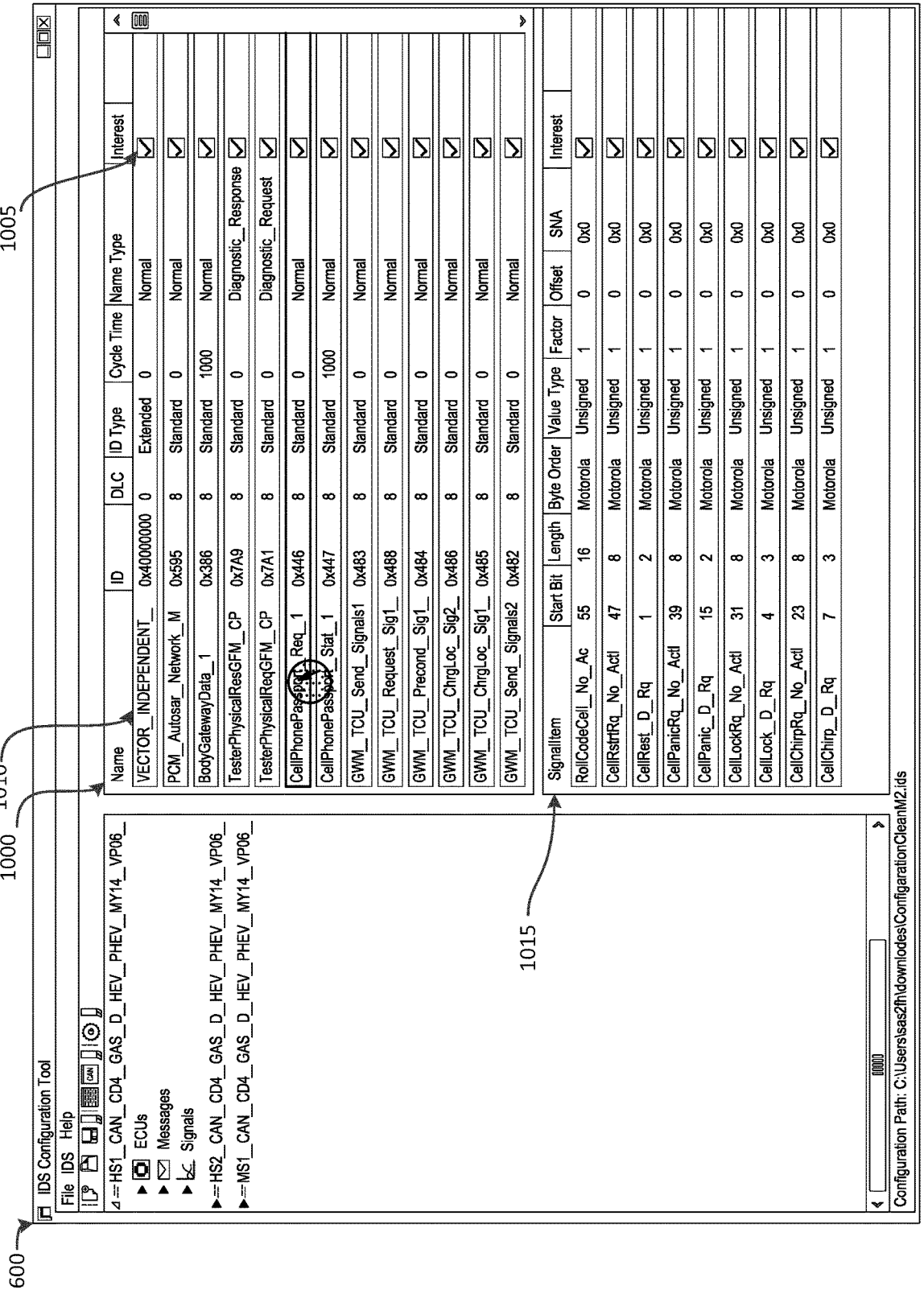

FIG. 9 and FIG. 10 illustrate example elements of the GUI that allow a user to select communication components to monitor. FIG. 9 illustrates a pane 900 in the window 600 that allows a user to select electronic control units to monitor during the configuration process. In some embodiments, the electronic processor 201 receives a selection of electronic control units to monitor when a user clicks on checkboxes (for example, checkbox 905) displayed next to a name (for example, electronic control unit name 910) of each electronic control unit. When a checkbox contains a checkmark, the electronic control unit whose name is next to the checked checkbox is selected to be monitored by the electronic processor 201. When the electronic processor 201 receives a selection of an electronic control unit, the electronic processor 201 monitors the messages 110 and signals associated with the selected electronic control unit during the configuration process. In some embodiments, when a user selects (for example, by clicking) a checked checkbox, the electronic processor 201 receives a selection of an electronic control unit not to monitor.

FIG. 10 illustrates a pane 1000 in the window 600 that allows a user to select messages (from the messages associated with electronic control units the user selected) to monitor during the configuration process. In the example provided, a user selects and unselects messages by clicking on the checkboxes (for example, checkbox 1005) displayed next to a name (for example, message name 1010) of each message. When a checkbox contains a checkmark, the message whose name is next to the checked checkbox is selected to be monitored by the electronic processor 201. Selecting a message in the pane 1000 causes each signal carried by the message to appear in a pane 1015. In some embodiments, when a user selects (for example, by clicking) a checked checkbox, the electronic processor 201 receives a selection of a message not to monitor. In some embodiments, a selection of signals to monitor, a selection of signals not to monitor, or both may be received by the electronic processor 201 via GUI elements similar to the GUI elements described in FIG. 9 and FIG. 10.

Figure 11:
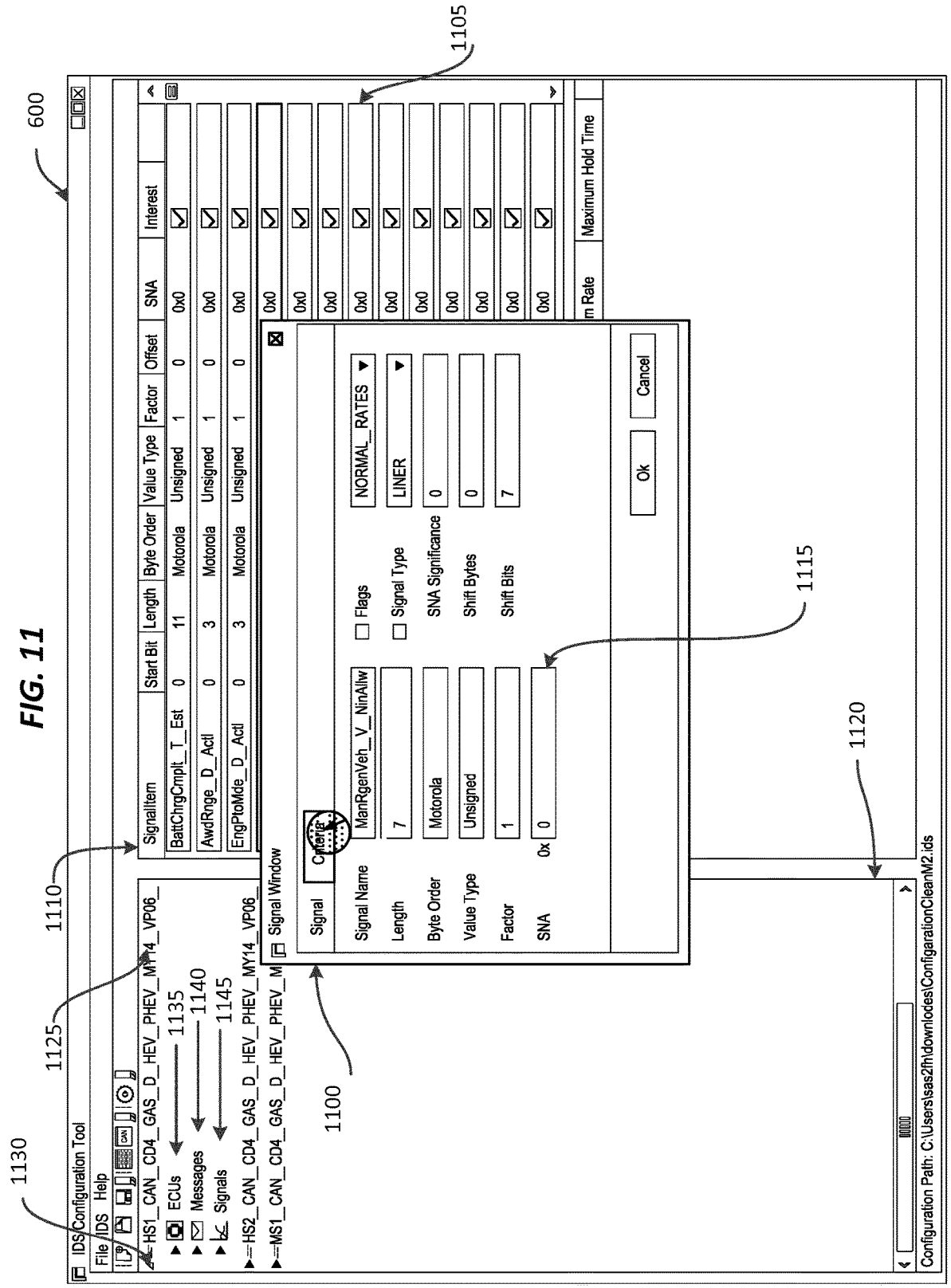

FIG. 11 illustrates the electronic processor 201 receiving modifications to configuration values for one or more signals carried within the messages when a user enters values via a signal dialogue box 1100. In the example shown, if the user selects the signal 1105 from a pane 1110, then the signal dialogue box 1100 is displayed in the GUI. The electronic processor 201 receives configuration values when the user enters values in the text fields (for example the text field 1115) of the signal dialogue box 1100. In some embodiments, the electronic processor 201 receives modifications to configuration values for one or more messages when the user enters values in the text fields via a dialogue box that is, for example, similar to the signal dialogue box 1100.

FIG. 9 through FIG. 13 also illustrate a pane 1120 that allows a user to select communication components to monitor and change the configuration values of the intrusion detection system. In the example illustrated, the pane 1120 displays a plurality of bus names and an arrow next to each bus name (for example, the bus name 1125 and the arrow 1130). When a user, for example, selects the arrow or the bus name, a drop down menu appears in the pane 1120. In the example illustrated, the drop down menu includes three options with arrows next to each option. The options included in the drop down menu are electronic control units 1135, messages 1140, and signals 1145. When the electronic processor 201 receives a selection of an option in the drop down menu each electronic control unit, message, or signal associated with the bus name is displayed within the pane 1120, depending on which option was selected. For example, if the electronic processor 201 receives a selection of the messages 1140, each message associated with the bus name 1125 is displayed in the pane 1120. When an electronic control unit, a message, or a signal is selected from the electronic control units, messages, and signals associated with the bus name, the electronic processor 201 may monitor the selected electronic control unit, a message, or a signal. If a message or a signal is selected from the messages and signals associated with the bus name, the electronic processor 201 may display dialogue box (similar to the signal dialogue box 1100, for example) and receive a selection of configuration values (adjustment input).

It should be understood that methods and GUI elements for selecting communication components to monitor and for changing configuration values, other than the methods and GUI elements described above, are possible. Therefore, the embodiments described herein should not be considered to be in any way limiting.

Figure 12:
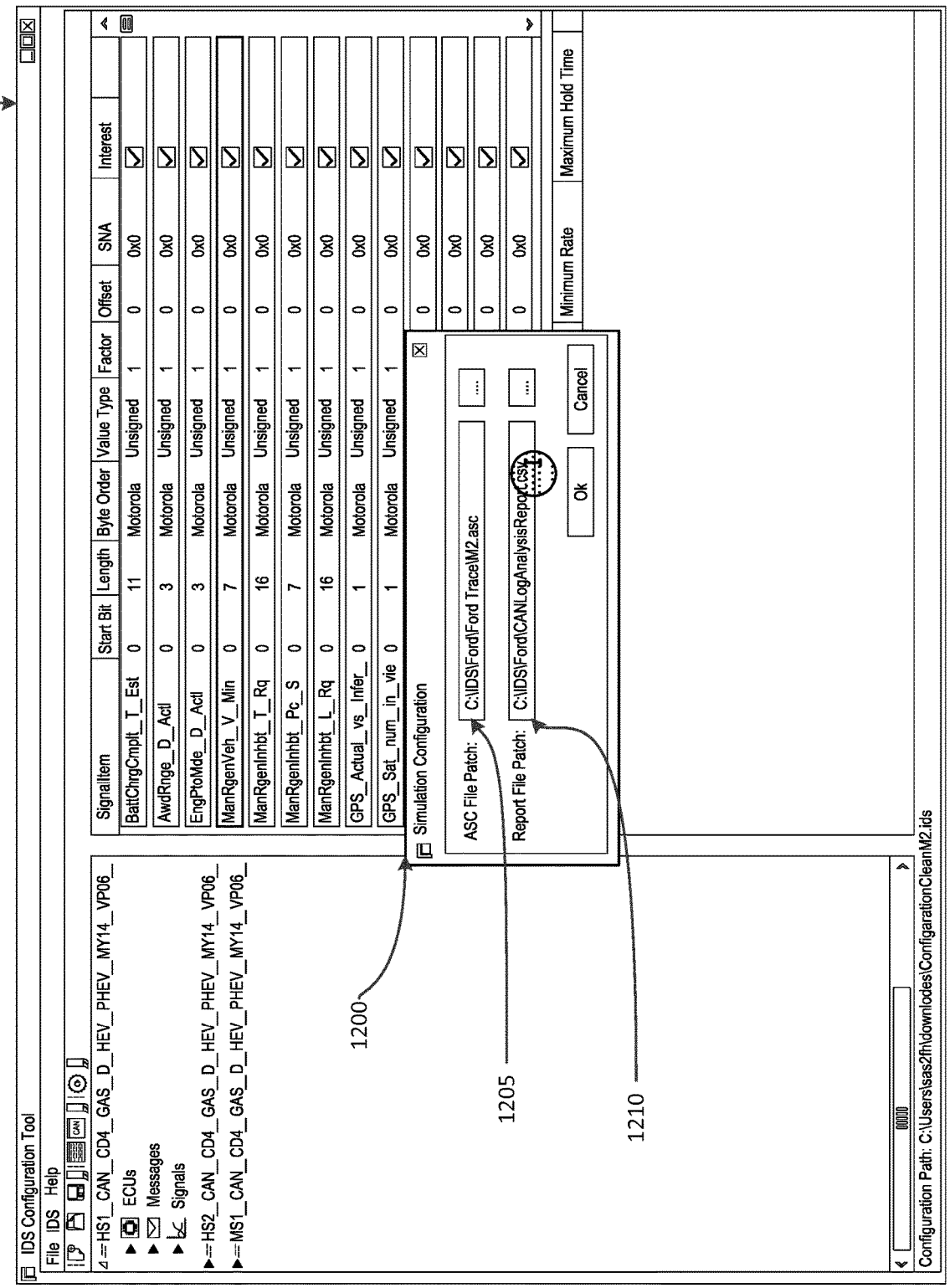

FIG. 12 illustrates a simulation configuration dialogue box 1200 for running a simulation using a clean trace file. In the example shown, the clean trace file is specified in a text field 1205 of the simulation configuration dialog box labeled "ASC File Path." The electronic processor 201 records anomalies it detects when running the simulation with the clean trace file in the simulation results log file 225. The simulation results log file 225 is specified in a text field 1210 of the simulation configuration dialog box, labeled "Report File Path."

Figure 13:
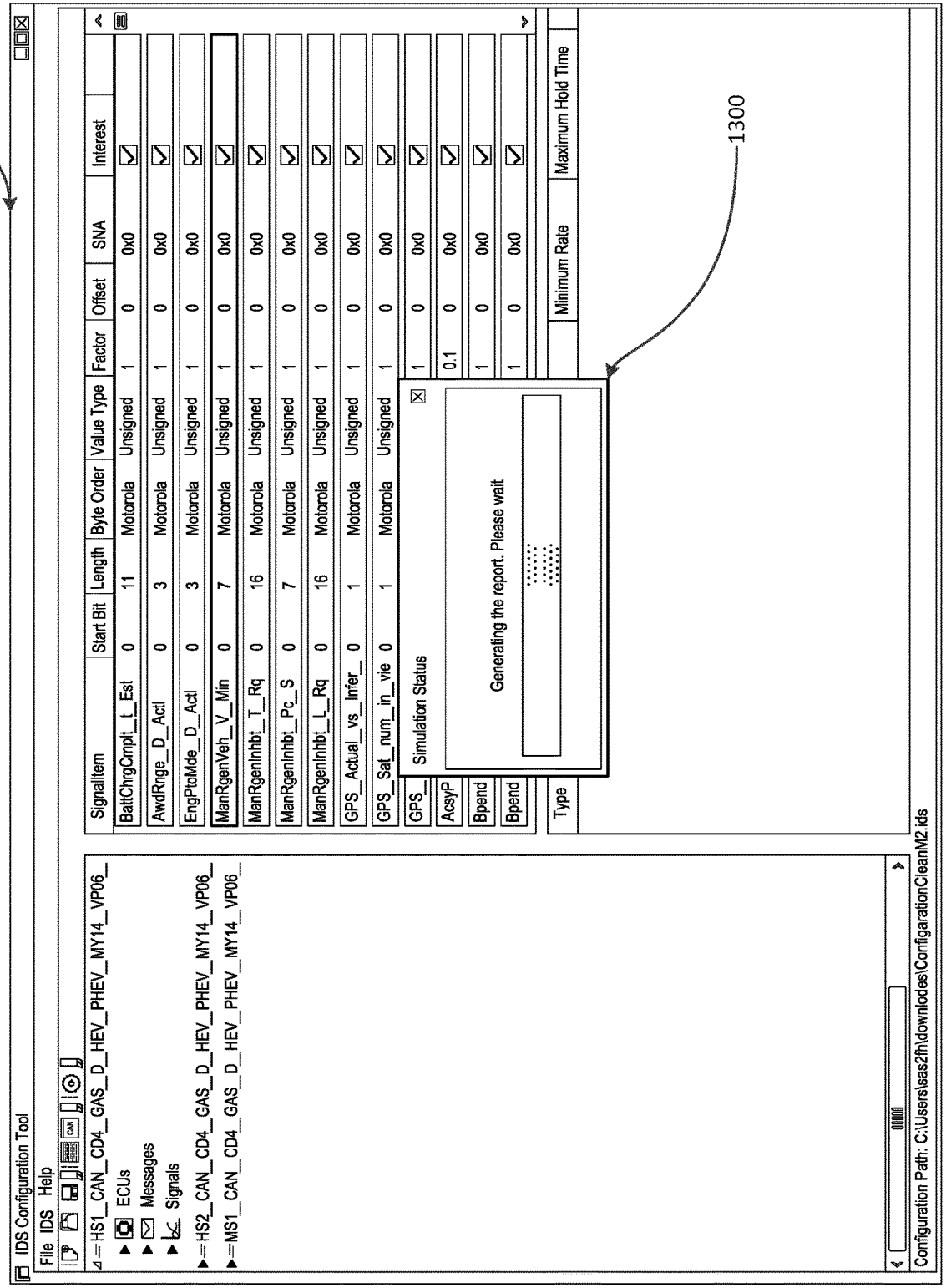

FIG. 13 illustrates an example pop-up message 1300 that is displayed on the display device 204, according to some embodiments, when the simulation is running. In other embodiments, pop-up messages, dialogue boxes, windows, and the like may be displayed in place of the pop-up message 1300. In yet other embodiments, no indication that a simulation is running is displayed.

Figure 14:
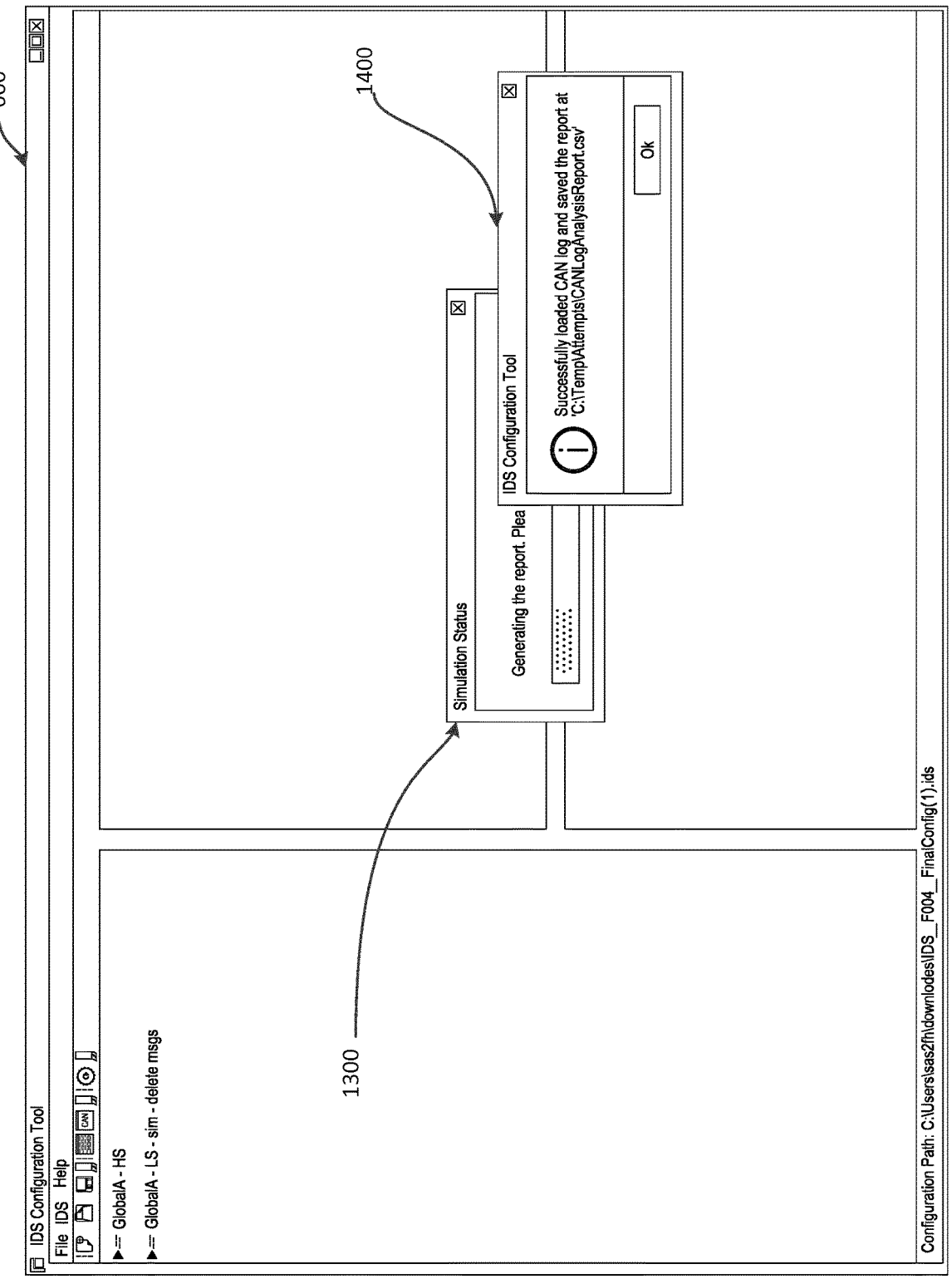

FIG. 14 illustrates an example embodiment in which a pop-up message 1400 displayed on the display device 204 when the simulation is complete. In other embodiments, pop-up messages, dialogue boxes, windows, and the like may be displayed in place of the pop-up message 1400. In yet other embodiments, no indication that the simulation is complete is displayed. Anomalies detected by the electronic processor 201 during the simulation run are recorded in the simulation results log file 225 specified in the text field 1210 labeled "Report File Path."

FIG. 15 is an example of contents of the simulation results log file 225 (the results 240 of the simulation) in which information regarding anomalies detected during a simulation is recorded. In the embodiment shown in FIG. 15, the results 240 of the simulation included in the simulation results log file 225 are displayed within a window 1500 of the GUI after a simulation is run. In other embodiments, the results 240 of the simulation included in the simulation results log file 225 are displayed within the window 600.

Various features, advantages, and embodiments are set forth in the following claims.

What is claimed is:

1. A system for configuring an intrusion detection system, the system comprising:
    an input device,
    a display device, and
    an electronic processor, the electronic processor configured to
        receive input, via the input device, including a previous configuration file, a data bus configuration file, and user input,
        obtain configuration values from the user input, wherein the configuration values define conditions associated with messages and signals, and the conditions are a basis for detection of an anomaly associated with the messages and the signals,
        run, with an intrusion detection system configuration tool, a simulation of communication on a vehicle communication system based on the input received,
        generate log errors of the simulation associated with anomalies, wherein the log errors are at least one selected from the group consisting of a detected false positive and a detected false negative,
        repeatedly determine an adjustment to configuration values based on the log errors of the simulation associated with anomalies, until no false positives and no false negatives occur in results of running the simulation,
        display, on the display device, the results of running the simulation with the intrusion detection system configuration tool, and
        output a new configuration file and a file configured to be uploaded to a vehicle.

2. The system according to claim 1, wherein the electronic processor is further configured to store, in a log file, the results of running the simulation.

3. The system according to claim 1, wherein the electronic processor is configured to receive user input by receiving a selection of communication components of the vehicle communication system to monitor including at least one selected from a group consisting of buses, electronic control units, signals, and messages.

4. The system according to claim 1, wherein the electronic processor is further configured to set a configuration value based on the user input.

5. The system according to claim 1, wherein the electronic processor is configured to run a simulation of communication on a vehicle communication system using the input received by running the simulation with a trace file that contains message data with anomalies.

6. The system according to claim 1, wherein the electronic processor is configured to run a simulation of communication on a vehicle communication system using the input received by running the simulation with a trace file that contains message data without anomalies.

7. The system according to claim 4, wherein the electronic processor is further configured to receive an adjustment input for the configuration value, based on the results of running the simulation.

8. The system according to claim 2, wherein the electronic processor is configured to display, on the display device, results of running the simulation with the intrusion detection system configuration tool by displaying the results of running the simulation stored in the log file, the results including, for each anomaly detected during the simulation, information regarding the anomaly.

9. A method for configuring an intrusion detection system, the method comprising:
setting a configuration value, wherein the configuration value defines a condition associated with a message and a signal, and the condition is a basis for detection of an anomaly associated with the message and the signal;
running, with an electronic processor, a simulation of communication on a vehicle communication system with a trace file;
generating, with the electronic processor, log errors of the simulation associated with anomalies, wherein the log errors are at least one selected from the group consisting of a detected false positive and a detected false negative,
repeatedly determining, with the electronic processor, an adjustment to the configuration value based on the log errors of the simulation associated with anomalies, until no false positives and no false negatives occur in results of running the simulation,
generating the results of the simulation;
receiving, with the electronic processor, an adjustment input for the configuration value;
outputting, with the electronic processor, a file including configuration values for the intrusion detection system, wherein the file is configured to be uploaded to the vehicle.

10. The method according to claim 9, wherein generating results of the simulation includes storing the results of the simulation in a log file.

11. The method according to claim 10, wherein generating results of the simulation includes displaying the results of the simulation stored in the log file on a display device.

12. The method according to claim 9, the method further comprising selecting communication components of the vehicle communication system to monitor, the communication components including at least one selected from a group consisting of buses, electronic control units, signals, and messages.

13. The method according to claim 9, wherein running a simulation of communication on a vehicle communication system with a trace file includes running the simulation with a trace file that contains message data with anomalies.

14. The method according to claim 9, wherein running a simulation of communication on a vehicle communication system with a trace file includes running the simulation with a trace file that contains message data without anomalies.

15. The method according to claim 9, wherein the adjustment input for the configuration value is based on the results of the simulation.

16. The method according to claim 9, wherein generating results of the simulation includes generating, for each anomaly detected during the simulation, information regarding the anomaly.

17. The system according to claim 1, wherein the configuration values associated with the messages is one of the configuration values selected from a group consisting of: a predetermined period of time between messages with the same message identifier, a rate limit of the messages received, a location of reserved bits where no signal is defined, and a predetermined valid message length.

18. The system according to claim 1, wherein the configuration values associated with the signals is one of the configuration values selected from a group consisting of: a valid signal range, an invalid signal range, and a predetermined threshold rate that a value of a signal changes.

* * * * *